United States Patent
Lee et al.

(10) Patent No.: US 9,946,086 B2
(45) Date of Patent: Apr. 17, 2018

(54) STEREOSCOPIC IMAGE DISPLAY AND METHOD OF DRIVING THE SAME

(71) Applicant: LG DISPLAY CO., LTD., Seoul (KR)

(72) Inventors: Changho Lee, Paju-si (KR); Seungho Baek, Goyang-si (KR); Jooah Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/105,963

(22) Filed: Dec. 13, 2013

(65) Prior Publication Data

US 2014/0375706 A1 Dec. 25, 2014

(30) Foreign Application Priority Data

Jun. 19, 2013 (KR) ........................ 10-2013-0070197

(51) Int. Cl.
*G09G 3/36* (2006.01)
*G02B 27/22* (2018.01)
*G09G 3/00* (2006.01)

(52) U.S. Cl.
CPC ......... *G02B 27/2214* (2013.01); *G09G 3/003* (2013.01); *G09G 3/3611* (2013.01); *G09G 2330/08* (2013.01)

(58) Field of Classification Search
CPC ........... H04N 13/0459; H04N 13/0497; H04N 13/0438; H04N 13/0454; H04N 13/0434; H04N 13/0404; H04N 13/0413; G02F 1/133526; G02F 1/1347; G09G 2330/08; G09G 3/003; G09G 3/3611

(Continued)

(56) References Cited

U.S. PATENT DOCUMENTS

| 6,028,303 A | * | 2/2000 | Suzuki | G02B 27/281 |
| | | | | 250/225 |
| 8,823,889 B2 | * | 9/2014 | Chen | G02B 27/26 |
| | | | | 349/15 |

(Continued)

FOREIGN PATENT DOCUMENTS

| CN | 102749717 | * 10/2012 | ............. G02B 27/26 |
| CN | 102868906 A | 1/2013 | |

(Continued)

OTHER PUBLICATIONS

Office Action dated Mar. 3, 2016 for corresponding Chinese Patent Application No. 20130692729.5, 16 pages.

*Primary Examiner* — William Boddie
*Assistant Examiner* — Alecia D English
(74) *Attorney, Agent, or Firm* — Seed Intellectual Property Law Group LLP

(57) ABSTRACT

A stereoscopic image display includes a display panel; a polarization control panel that is positioned on the display panel and controls the polarization direction of light incident from the display panel; a lens panel positioned on the polarization control panel and having a plurality of lens shaping portions; a first driver for driving the display panel; a second driver for supplying a driving voltage to the polarization control panel; a timing controller for controlling the first driver and the second driver; and a sensing unit that senses the driving voltage supplied to the polarization control panel and outputs a decision signal for deciding whether the sensed driving voltage is in normal condition or abnormal condition.

7 Claims, 7 Drawing Sheets

(58) Field of Classification Search
USPC ............... 359/464–465, 478; 349/15, 54; 324/760.01
See application file for complete search history.

(56) References Cited

U.S. PATENT DOCUMENTS

| | | | |
|---|---|---|---|
| 2004/0189278 A1* | 9/2004 | Bohnert et al. ................. | 324/96 |
| 2011/0050866 A1* | 3/2011 | Yoo ................................ | 348/53 |
| 2012/0313936 A1* | 12/2012 | Matsumoto ........ | G02B 26/0883 345/419 |
| 2013/0016096 A1* | 1/2013 | Kwon .................. | H04N 13/026 345/419 |
| 2013/0147863 A1* | 6/2013 | Kim .................. | G02B 27/2264 345/691 |
| 2013/0215076 A1* | 8/2013 | Lee ........................ | G09G 3/003 345/174 |
| 2014/0022638 A1* | 1/2014 | Wu ......................... | G02B 5/30 359/483.01 |
| 2014/0028933 A1* | 1/2014 | Chen et al. .................... | 349/15 |
| 2014/0104382 A1* | 4/2014 | Mori ............................. | 348/43 |

FOREIGN PATENT DOCUMENTS

| | | |
|---|---|---|
| JP | 2009-282410 A | 12/2009 |
| WO | WO 2012-169288 A1 | 12/2012 |

\* cited by examiner

STEREOSCOPIC IMAGE DISPLAY AND METHOD OF DRIVING THE SAME

This application claims the benefit of priority to Korean Patent Application No. 10-2013-0070197 filed on Jun. 19, 2013, which is incorporated herein by reference for all purposes as if fully set forth herein.

BACKGROUND

Field

This document relates to a stereoscopic image display and a method of driving the same.

Related Art

A stereoscopic image display may be classified into a stereoscopic technique or an autostereoscopic technique.

The stereoscopic technique includes a glasses type method and a non-glasses type method, both of which have been put onto practice. In the glasses type method, the parallax image between the left and right eyes is displayed on a direct-view display or a projector through a change in a polarization direction of the parallax image or in a time division manner, and thus the user views a stereoscopic image using polarization glasses or liquid crystal shutter glasses. In the non-glasses type method, an optical plate such as a parallax barrier for separating an optical axis of the parallax image between the left and right eyes is generally installed in front of or behind a display screen.

In recent years, the commercialization of stereoscopic image displays and the development of a variety of technologies have contributed to the development of polarization-controlled non-glasses type stereoscopic image displays. A polarization-controlled non-glasses type stereoscopic image display controls the polarization direction of incident light by supplying a constant level of driving voltage to a polarization control panel positioned under a lens panel.

The polarization control panel does not work normally if the internal structure or an electrode is damaged due to a defect in manufacturing (e.g., the entry of a foreign material or a crack in the electrode) or due to user's carelessness. This decreases the driving voltage supplied to the polarization control panel or makes the driving voltage irregular, causing a difference in in-plane retardation, or this incurs a loss of polarization control due to defective charging, resulting in a decrease of the display quality of a stereoscopic image. When these problems arise, the user may see them as just a matter of decreased picture quality and become unsatisfied with the product (or device), thus generating a demand for improvement.

SUMMARY

A stereoscopic image display comprises: a display panel; a polarization control panel that is positioned on the display panel and controls the polarization direction of light incident from the display panel; a lens panel positioned on the polarization control panel and having a plurality of lens shaping portions; a first driver for driving the display panel; a second driver for supplying a driving voltage to the polarization control panel; a timing controller for controlling the first driver and the second driver; and a sensing unit that senses the driving voltage supplied to the polarization control panel and outputs a decision signal for deciding whether the sensed driving voltage is in normal condition or abnormal condition.

In another aspect, a method of driving a stereoscopic image display, the method comprises: driving a display panel; supplying a driving voltage to a polarization control panel that is positioned on the display panel and controls the polarization direction of light incident from the display panel; sensing the driving voltage supplied to the polarization control panel and deciding whether the sensed driving voltage is in normal condition or abnormal condition; and if the polarization control panel is detected as abnormal, switching the screen of the display panel to abnormal mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to embodiments of the invention, examples of which are illustrated in the accompanying drawings.

Hereinafter, a concrete exemplary embodiment of the present invention will be described with reference to the accompanying drawings.

Figure 1:
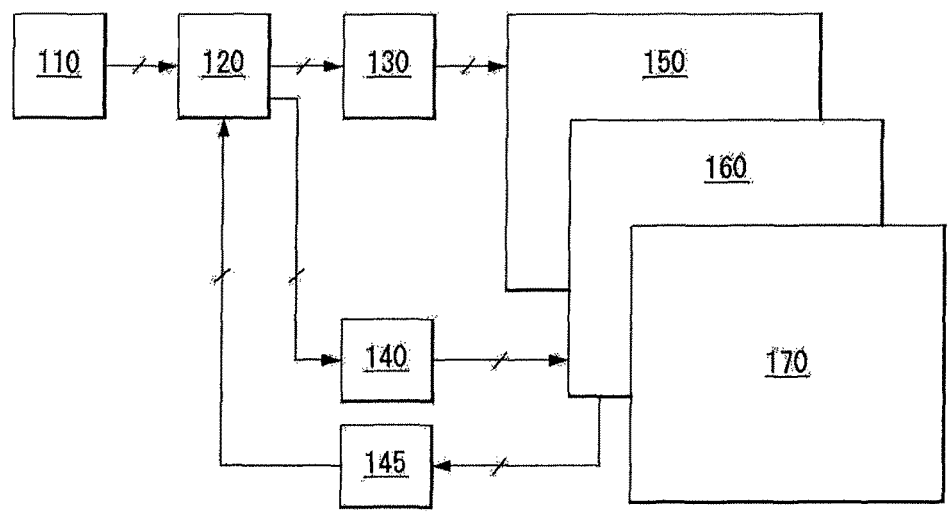
FIG. 1 is a schematic configuration view of a stereoscopic image display according to one exemplary embodiment of the present invention.
Figure 2:
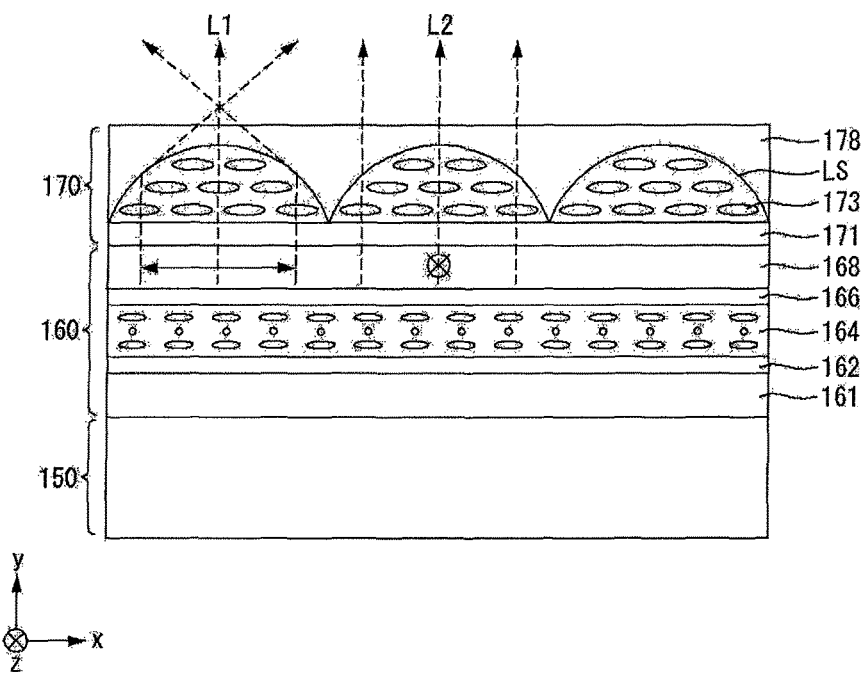
FIG. 2 is an illustration of a cross-section of a panel section of FIG. 1.
Figure 3:
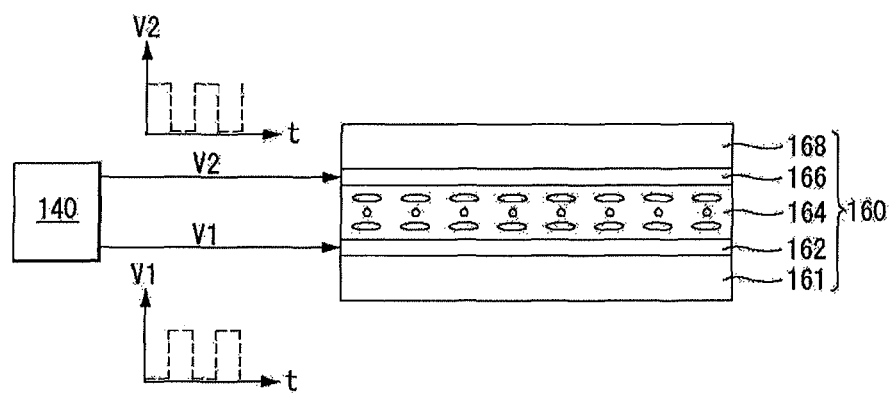
FIG. 3 is an illustration of a driving voltage supplied to a polarization control panel.
Figure 4:
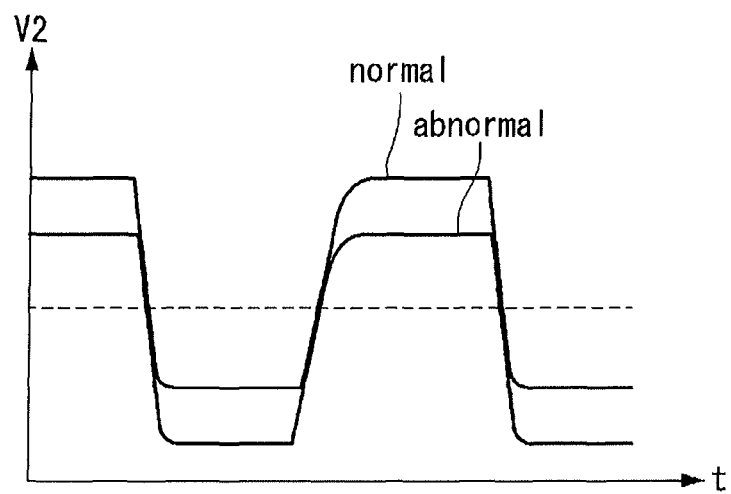
FIG. 4 is a waveform diagram for explaining the normal condition and abnormal condition of the driving voltage supplied to the polarization control panel.

FIG. 1 is a schematic configuration view of a stereoscopic image display according to one exemplary embodiment of the present invention. FIG. 2 is an illustration of a cross-section of a panel section of FIG. 1. FIG. 3 is an illustration of a driving voltage supplied to a polarization control panel. FIG. 4 is a waveform diagram for explaining the normal condition and abnormal condition of the driving voltage supplied to the polarization control panel.

As illustrated in FIGS. 1 to 4, a stereoscopic image display according to one exemplary embodiment of the present invention comprises an image supply unit 110, a timing controller 120, a first driver 130, a second driver 140, a sensing unit 145, a display panel 150, a polarization control panel 160, and a lens panel 170. The display panel 150, the polarization control panel 160, and the lens panel 170 belong to a panel section.

The image supply unit 110 produces 2D image frame data in a 2D mode and produces 3D image frame data in a 3D mode. The image supply unit 110 supplies image frame data and various timing signals, such as a vertical sync signal, a horizontal sync signal, a data enable, and a main clock, to the timing controller 120. The image supply unit 110 may be formed on a system board.

The timing controller 120 receives 2D image frame data from the image supply unit 110 in the 2D mode and 3D image frame data from the image supply unit 110 in the 3D mode. In the 3D mode, the timing controller 120 converts image frame data input from the image supply unit 110 into a frame frequency of (60×n) Hz (n is a positive integer equal to or greater than 2), for example, 120 Hz and supplies it to the first driver 130. The timing controller 120 may increase the frequency of a timing control signal for controlling the operation timing of either one or both of the first driver 130 and second driver 140 by multiplying the frame frequency of an input image n times. The timing controller 120 may be formed on a printed circuit board that is electrically connected to the system board.

The first driver comprises a data driver connected to data lines of the display panel 150 and a gate driver connected to gate lines of the display panel 150. The data driver converts digital type image frame data input from the timing controller 120 into positive/negative analog type image frame data under the control of the timing controller 120 and supplies it to the data lines. The gate driver sequentially supplies scan signals (or gate pulses) to the gate lines under the control of the timing controller 120. The first driver 130 may be formed on a flexible circuit substrate that is electrically connected to the printed circuit board, or part (e.g., the gate driver) of the first driver 130 may be formed on the display panel 150.

The display panel PNL displays a two-dimensional image or a three-dimensional image in accordance with the image frame data. The display panel PNL may be implemented as a liquid crystal panel LCD, an organic light-emitting diode display panel OLED, a plasma display panel PDP, or an electrophoretic display panel. However, this exemplary embodiment will be described taking a liquid crystal panel as an example. The display panel PNL, which is a liquid crystal panel, comprises a thin film transistor (hereinafter, "TFT") substrate and a color filter substrate. A lower polarizer and an upper polarizer are attached to the TFT substrate and the color filter substrate, respectively. A first liquid crystal layer is formed between the TFT substrate and the color filter substrate. The data lines and the gate lines are formed on the TFT substrate so as to cross each other at right angles, and sub-pixels defined by the data lines and the gate lines are disposed thereon. The display panel PNL, i.e., liquid crystal panel, can be formed in any liquid crystal mode as well as the TN mode, the VA mode, the IPS mode, and the FFS mode. The display panel PNL, i.e., liquid crystal panel, emits linearly polarized light or circularly polarized light provided from a backlight unit.

The polarization control panel 160 controls the polarization direction of light incident from the display panel 150. In response to a driving voltage supplied from the second driver 140, the polarization control panel 160 allows first linearly polarized light ⊗ incident from the display panel 150 to pass therethrough as it is or converts it into second linearly polarized light ↔ (or circularly polarized light, etc). The first linearly polarized light □ indicates light that oscillates and travels in a z-axis direction, and the second linearly polarized light ↔ that oscillates and travels in an x-axis direction.

The polarization control panel 160 comprises a first substrate 161, a second substrate 168, a lower electrode 162, an upper electrode 166, and a second liquid crystal layer 164. The first substrate 161 and the second substrate 168 are made of glass, films, etc. The lower electrode 162 is formed on the entire surface of the first substrate 161, and made of a transparent material (e.g., ITO, etc). The upper electrode 166 is formed on the entire surface of the second substrate 168, and made of a transparent material. The second liquid crystal layer 164 is formed between the lower electrode 162 and the upper electrode 166, and the arrangement of liquid crystals changes depending on a voltage difference between the lower electrode 162 and the upper electrode 166. The polarization control panel 160 may be attached or mounted on the display panel 150.

The second driver 140 outputs driving voltages for controlling the polarization control panel 160 under the control of the timing controller 120. The second driver 140 supplies a first driving voltage V1 and a second driving voltage V2 having a predetermined difference to the lower electrode 162 and upper electrode 166 of the polarization control panel 160 so that the polarization characteristics of the second liquid crystal layer 164 included in the polarization control panel 160 can change.

The second driver 140 may generate the first driving voltage V1 and the second driving voltage V2 in such a manner that a positive voltage and a negative voltage alternate with each other, in order to prevent the second liquid crystal layer 164 of the polarization control panel 160 from being kept driven. In this case, the phase of the second driving voltage V2 is opposite to the phase of the first driving voltage V1. The second driver 140 may be formed on a printed circuit board or a flexible circuit board.

The sensing unit 145 senses a driving voltage supplied to the polarization control panel 160 and outputs a decision signal for deciding whether the sensed driving voltage is in normal condition or abnormal condition. The sensing unit 145 is electrically connected to either one or both of the upper electrode 166 and the lower electrode 162. The sensing unit 145 may be formed on a printed circuit board or a flexible circuit board. Also, the sensing unit 145, together with the second driver 140, may be integrated into a single IC (integrated circuit).

The lens panel 170 has a plurality of lens shaping portions LS. The lens panel 170 has an anisotropic refractive index, which changes depending on the polarization direction of light incident from the polarization control panel 160. If the first linearly polarized light □ is incident, the liquid crystals have a short axial refractive index nO and the lens panel 170 allows the incident light to pass therethrough as its, as indicated by L2. If the second linearly polarized light ↔ is incident, the liquid crystals have a long axial refractive index ne and the lens panel 170 refracts the incident light, as indicated by L1.

The lens panel 170 comprises a lower substrate 171, an upper substrate 178, lens shaping portions LS, and a third liquid crystal layer 173. The lower substrate 171 is made of glass, films, etc. The upper substrate 178 is made of resin, etc, and the lens shaping portions LS have a short axial refractive index nO. A protective substrate may be further formed on the upper substrate 178, but will be omitted. The third liquid crystal layer 173 may be made of polymerizable liquid crystal, which is aligned in the polarization direction of the second linearly polarized light ↔ and then hardened and formed between the lower substrate 171 and the lens shaping portions LS.

Meanwhile, in the above-explained non-glasses type stereoscopic image display, the polarization control panel 160 does not work normally if the internal structure or an electrode is damaged due to a defect in manufacturing (e.g., the entry of a foreign material or a crack in the electrode) or due to user's carelessness. This decreases the driving voltage supplied to the polarization control panel 160 or makes the driving voltage irregular, causing a difference in in-plane retardation, or this incurs a loss of polarization control due to defective charging, resulting in a decrease of the display quality of a stereoscopic image. When these problems arise, the user may see them as just a matter of decreased picture quality and become unsatisfied with the product (or device), thus generating a demand for improvement.

In an exemplary embodiment of the present invention, the state of the polarization control panel 160 is detected by the sensing unit 145, and the devices included in the stereoscopic image display, which will be concretely explained below.

Figure 5:
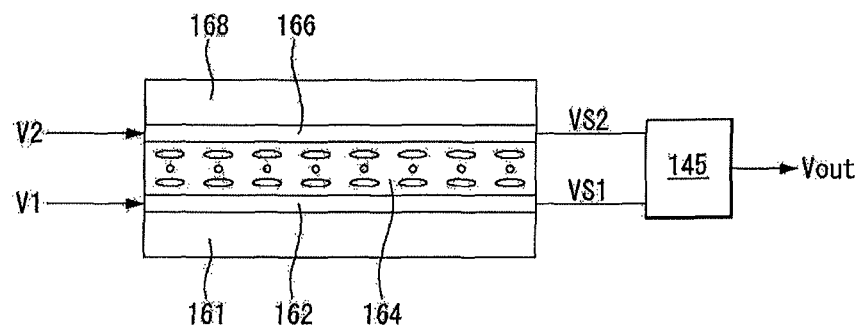
FIG. 5 is a view showing a polarization control panel and a sensing unit.
Figure 6:
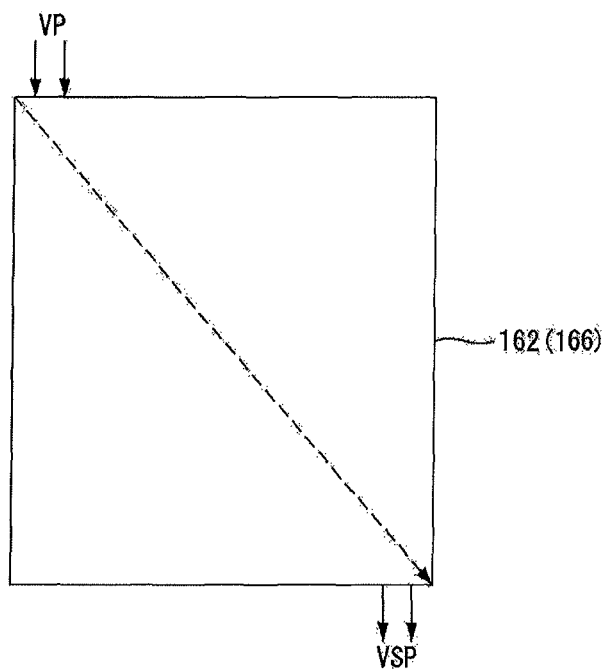
FIG. 6 is a view for explaining the position of an input terminal for inputting a driving voltage and the position of a sensing terminal for sensing a driving voltage.
Figure 7:
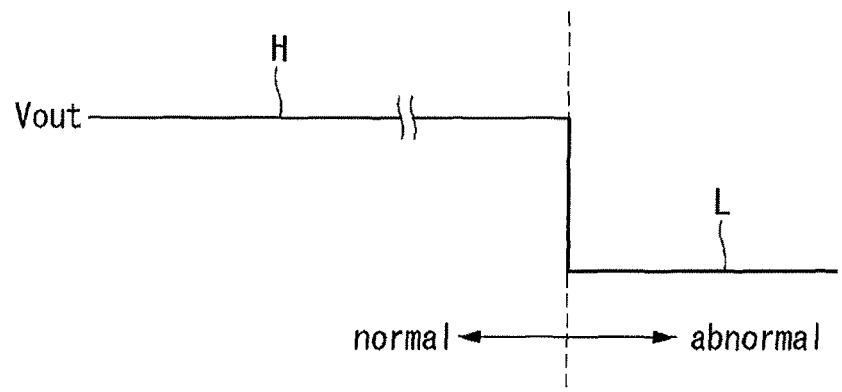
FIG. 7 is an illustration of a decision signal.
Figure 8:
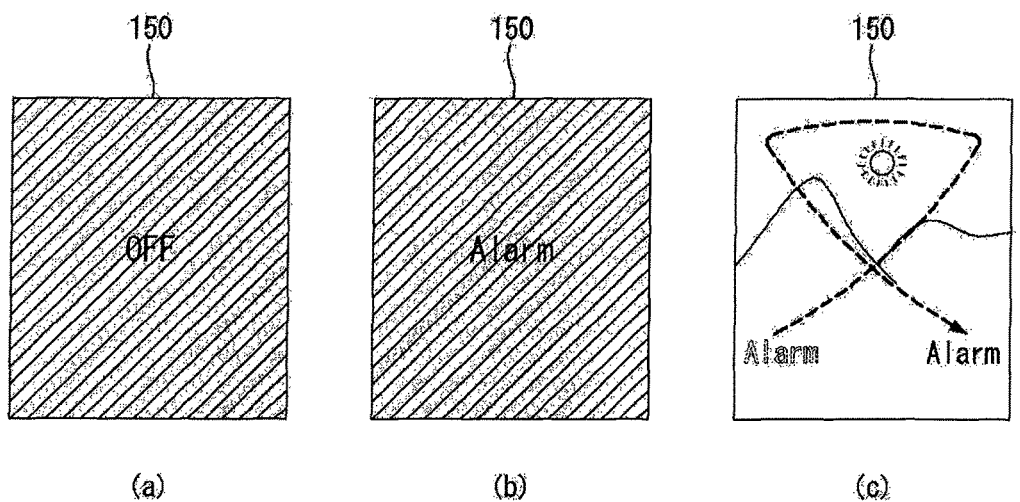
FIG. 8 illustrates a state diagram of a display panel that has switched to abnormal mode.

FIG. 5 is a view showing a polarization control panel and a sensing unit. FIG. 6 is a view for explaining the position of an input terminal for inputting a driving voltage and the position of a sensing terminal for sensing a driving voltage. FIG. 7 is an illustration of a decision signal. FIG. 8 illustrates a state diagram of a display panel that has switched to abnormal mode.

As illustrated in FIG. 1, FIG. 5, and FIG. 8, the sensing unit 145 senses the first driving voltage V1 and second driving voltage V2 supplied to the lower electrode 162 and upper electrode 166 through the lower electrode 162 and upper electrode 166 of the polarization control panel 160. To this end, the sensing unit 145 is electrically connected to the lower electrode 162 and upper electrode 166 of the polarization control panel 160.

The sensing unit 145 is electrically connected to a region farthest away from the regions to which the first and second driving voltages V1 and V2 are supplied, so as to sense the voltages by considering the RC delay value (R is a resistance component, and C is a capacitor component). Therefore, the sensing unit 145 senses the first and second driving voltages V1 and V2 through a second point VSP of the electrode 162 or 166 of the polarization control panel 160, which is farthest away from a first point VP of the electrode 162 or 166 of the polarization control panel 160 to which the first and second driving voltages V1 and V2 are supplied.

The sensing unit 145 senses the first and second driving voltages V1 and V2 supplied to the lower electrode 162 and upper electrode 166 of the polarization control panel 160, and outputs a decision signal Vout for deciding whether the sensed driving voltages VS1 and VS2 are in normal condition or abnormal condition.

The sensing unit 145 can supply the decision signal Vout output from itself to the timing controller 120. If the decision signal Vout supplied from the sensing unit 145 is logic high (H), this is detected as normal (or a normal driving voltage range). On the other hand, if the decision signal Vout is logic low (L), this is detected as abnormal (or an abnormal driving voltage range). An exemplary embodiment of the present invention has been explained with an example in which, if the decision signal Vout is logic high (H), this is detected as normal and, if the decision signal Vout is logic low (L), this is detected as abnormal—and vice versa.

The timing controller 120 analyzes the decision signal Vout and detects the polarization control panel 160 as abnormal, it may switch the screen of the display panel 150 to abnormal mode.

In an example, if the timing controller 120 analyzes the decision signal Vout and detects the polarization control panel 160 as abnormal, it may control the display panel 150 to display a black image, as shown in (a) of FIG. 8. In this case, the output terminal of the sensing unit 145 and the input terminal of the timing controller 120 are electrically connected together through one wire, and the timing controller 120 may be implemented to activate or deactivate the screen of the display panel 150 depending on the logic state of the decision signal Vout.

In another example, if the timing controller 120 analyzes the decision signal Vout and detects the polarization control panel 160 as abnormal, it may control the display panel 150 to display a black image and an alarm, as shown in (b) of FIG. 8. In this case, the timing controller 120 may be implemented to extract an alarm data signal corresponding to the alarm from an internal memory and supply the extracted alarm data signal to the display panel 160 through the data driver. The alarm may be fixed at a specific position, such as the bottom, middle, top, left side, or right side of the screen, to flicker so that the user can easily identify the abnormal condition of the polarization control panel 160.

In yet another example, if the timing controller 120 analyzes the decision signal Vout and detects the polarization control panel 160 as abnormal, it may control the display panel 150 to display the original image and an alarm, as shown in (c) of FIG. 8. The alarm may continuously move from a first position to a second position, from a third position to a fourth position, and the like on the screen so that the user can easily identify the abnormal condition of the polarization control panel 160.

If the decision signal Vout is analyzed by the timing controller 120 and the polarization control panel 160 is detected as abnormal, the timing controller 120 may control the display panel 150 to deactivate the second driver 140 adapted to drive the polarization control panel 160, as well as the display panel 160. While the present invention has been explained with an example in which the timing controller 120 analyzes the decision signal Vout, the image supply unit 110 or other devices may analyze the decision signal Vout. Also, the above description has been given of several examples of letting the user know that the polarization control panel 160 is in abnormal condition when abnormal mode occurs; however, the present invention is not limited thereto.

Hereinafter, an example of the circuit configuration of the sensing unit will be described.

Figure 9:
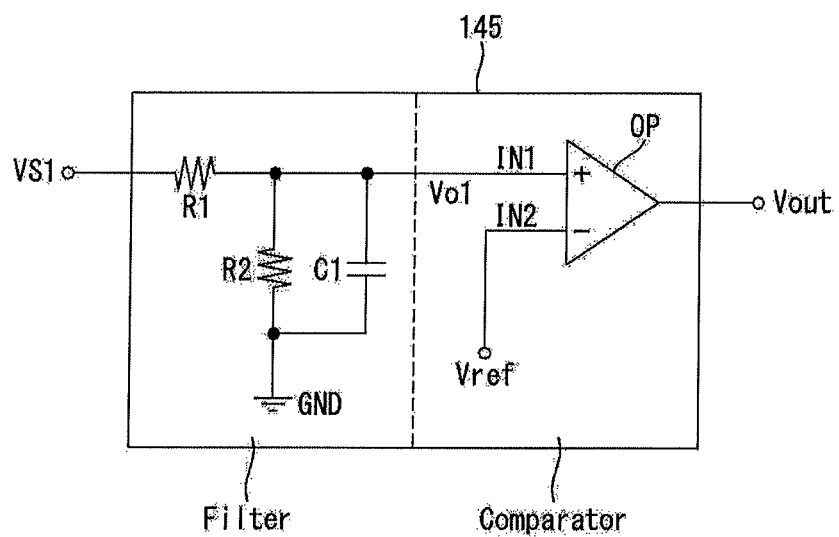
FIG. 9 illustrates the circuit configuration of a sensing unit for sensing a driving voltage.
Figure 10:
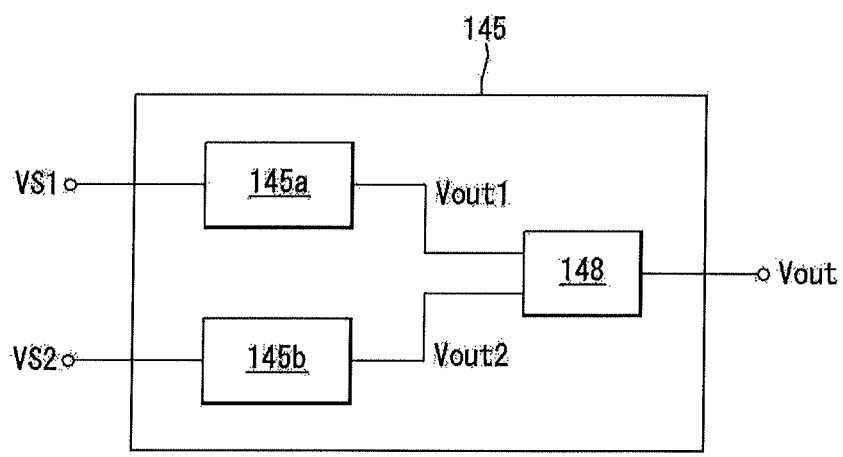
FIG. 10 is a block diagram of a sensing unit for sensing two driving voltages.

FIG. 9 illustrates the circuit configuration of a sensing unit for sensing one driving voltage. FIG. 10 is a block diagram of a sensing unit for sensing two driving voltages.

As illustrated in FIG. 9, the sensing unit 145 is configured to sense only one driving voltage and then output a decision signal Vout based on this driving voltage.

The sensing unit 145 may output a decision signal Vout based on a compari, son result between a sensed driving voltage VS1 and an internal reference voltage Vref. The sensing unit 145 may comprise a filter that smoothes the sensed driving voltage VS1 to be close to the DC level and a comparator OP that compares a filtering voltage Vo1 output from the filter and the internal reference voltage Vref and outputs a decision signal Vout. The internal reference voltage Vref serves as a criterion for determining whether the sensed driving voltage VS1 has a high level or low level compared to an internal threshold voltage.

The filter comprises an RC integrating circuit consisting of resistors R1 and R2 and a capacitor C1. One end of the first resistor R1 is connected to an electrode of the polarization control panel, and the other end is connected to a non-inverting terminal IN1 (+) of the comparator OP. One end of the second resistor R2 is connected to the other end of the first resistor R1, and the other end is connected to a ground line GND. One end of the first capacitor C1 is connected to the other end of the first resistor R1, and the other end is connected to the ground line GND. The filter filters the sensed driving voltage with an RC time constant to smooth it to be close to the DC level, and then outputs a filtering voltage Vo1.

The non-inverting terminal IN1 (+) of the comparator OP is connected to the other end the first resistor R1, and an inverting terminal IN2 (−1) of the comparator OP is connected to a reference voltage line that supplies the internal reference voltage Vref, and the comparator OP outputs a decision signal Vout through an output terminal OUT. The comparator OP compares the filtering voltage Vo1 supplied to the non-inverting terminal IN1 (+) and the reference voltage Vref supplied to the inverting terminal IN2 (−), and outputs a decision signal Vout corresponding to L if Vref>Vo1 and a decision signal Vout corresponding to H if Vref<Vo1.

As shown in FIG. 10, the sensing unit 145 is configured to sense two driving voltages and then output a decision signal based on these driving voltages.

The sensing unit 145 comprises a first sensing unit 145a, a second sensing unit 145b, and a signal output unit 148. The first sensing unit 145a senses a first driving voltage VS1 from the lower electrode of the polarization control panel and outputs a first result value Vout1. The second sensing unit 145b senses a second driving voltage VS2 form the upper electrode of the polarization control panel and outputs a second result value Vout2. The configuration of a circuit constituting the first and second sensing units 145a and 145b is as shown in FIG. 9, its description will be omitted. The signal output unit 148 receives the first result value Vout1 and the second result value Vout2, and outputs a decision signal Vout if any one of the first and second driving voltages is in abnormal condition. The sensing unit 145 may output a logic-high (H) decision signal Vout if the first and second driving voltages are in normal condition, and output a logic-low (L) decision signal Vout if any one of the first and second driving voltages is in abnormal condition.

As seen from the above explanation, an exemplary embodiment of the present invention has been described with an example in which the sensing unit 145 comprises a filter and a comparator OP or the sensing unit 145 comprises a filter, a comparator OP, and a signal output unit 148; however, the present invention is not limited thereto and the sensing unit 145 may further comprise another circuit.

Hereinafter, a method of driving a stereoscopic image display according to another exemplary embodiment of the present invention will be described.

Figure 11:
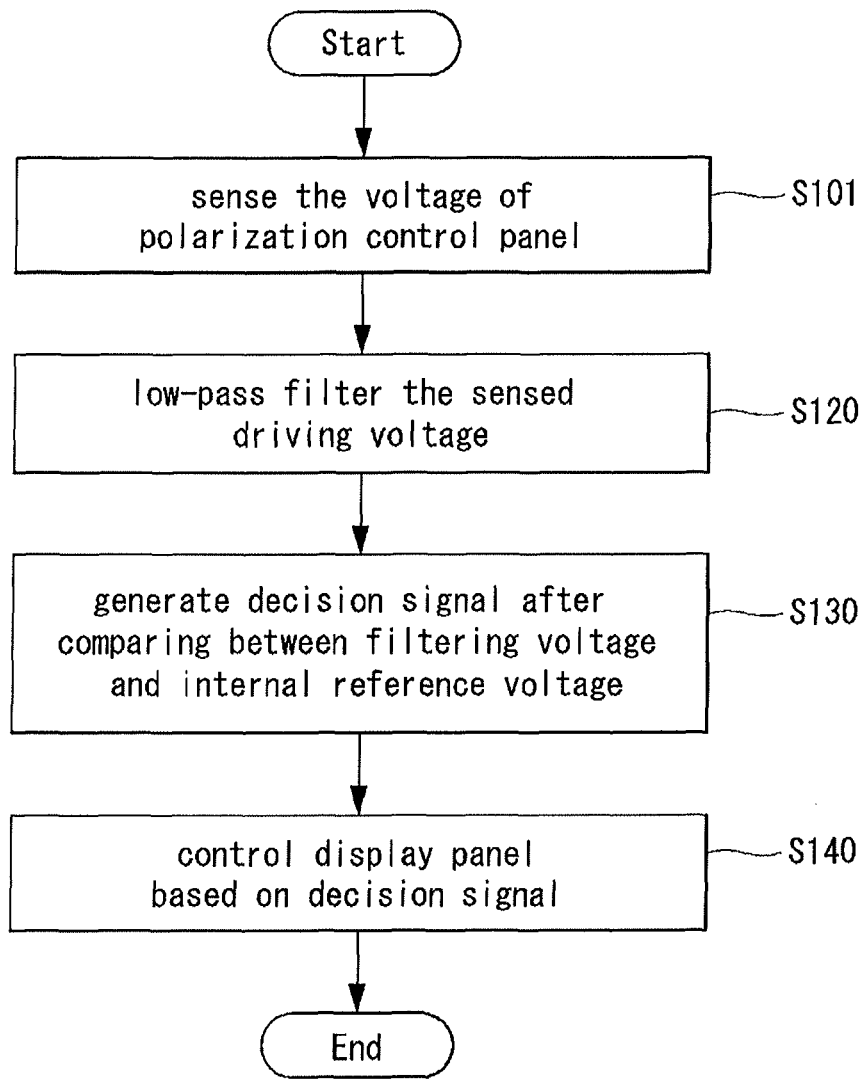
FIG. 11 is a flowchart of a method of driving a stereoscopic image display according to another exemplary embodiment of the present invention.
Figure 12:
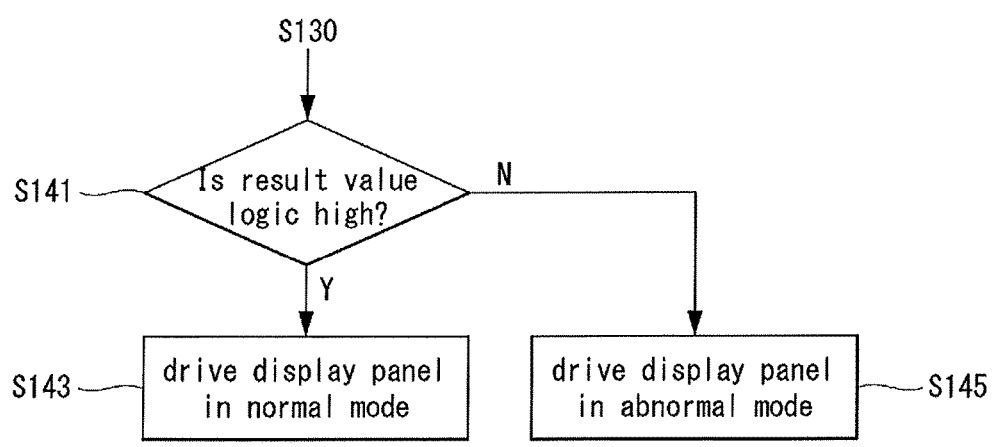
FIG. 12 is a detailed flowchart showing some of the steps of FIG. 11.

FIG. 11 is a flowchart of a method of driving a stereoscopic image display according to another exemplary embodiment of the present invention. FIG. 12 is a detailed flowchart showing some of the steps of FIG. 11.

A method of driving a stereoscopic image display according to another exemplary embodiment of the present invention comprises the process of supplying a driving voltage to a polarization control panel that drives a display panel, is positioned between the display panel and a lens panel, and controls the polarization direction of light incident from the display panel and the process of sensing the driving voltage supplied to the polarization control panel. Hereinafter, the process of sensing the driving voltage supplied to the polarization control signal will be described first below.

As illustrated in FIG. 11, the driving voltage supplied to the polarization control panel is sensed (S110). The process of sensing the driving voltage supplied to the polarization control panel can be performed by the sensing unit 145, as explained with reference to FIG. 5.

The sensed driving voltage is low-pass filtered (S120). The process of low-pass filtering the sensed driving voltage can be performed by the filter included in the sensing unit 145, as explained with reference to FIG. 9.

A decision signal is generated after comparing a filtering voltage and an internal reference voltage (S130). The process of generating a decision signal can be performed by the signal output unit 148 included in the sensing unit 145, as explained with reference to FIG. 10.

The display panel is controlled based on the decision signal (S140). The process of controlling the display panel based on a result value can be performed as the timing controller 120 and the sensing unit 145 operate in conjunction, as explained with reference to FIGS. 1, 7, and 8.

As illustrated in FIG. 12, the process of controlling the display panel based on the decision signal will be described in more detail below.

It is decided whether the decision signal is logic high or logic low (S141). If the decision signal is logic high (Y), the sensed driving voltage from the polarization control panel is detected as normal and the display panel is driven in normal mode (S143). On the other hand, if the decision signal is logic low (N), the sensed driving voltage from the polarization control panel is detected as abnormal, the display panel is driven in abnormal mode (S145).

Therefore, in another exemplary embodiment of the present invention, if the polarization control panel is detected as abnormal by analyzing the decision signal, the screen of the display panel is switched to abnormal mode, and if the polarization control panel is detected as normal by analyzing the decision signal, the screen of the display panel is maintained in the same normal mode as before.

While the step of switching the screen of the display panel may be performed as explained in FIG. 8, like displaying a black image or an alarm signal on the display panel, the present invention is not limited thereto.

As seen from above, the present invention can avoid the problem of the user's viewing an unstable image or let the user know about an unstable device status by detecting the state of the polarization control panel and, if the polarization control panel is detected as abnormal, deactivating the screen of the display panel or displaying an alarm on the screen of the display panel. Moreover, the present invention can prevent the polarization control panel from operating in abnormal condition by using a device capable of detecting the state of the polarization control panel. Furthermore, the present invention can implement a test circuit for inspections of products before shipment by using a device capable of detecting the state of the polarization control panel.

What is claimed is:
1. A stereoscopic image display comprising:
a display panel;
a polarization control panel that is positioned on the display panel and controls a polarization direction of light incident from the display panel;

a lens panel positioned on the polarization control panel and having a plurality of lens shaping portions;
a first driver that drives the display panel;
a second driver that supplies a polarization control driving voltage through a first point to an electrode of the polarization control panel;
a timing controller that controls the first driver and the second driver; and
a sensing unit that is electrically connected to the polarization control panel and the timing controller and that senses the polarization control driving voltage supplied to the polarization control panel and outputs a decision signal for deciding whether the sensed driving voltage is in normal condition or abnormal condition, the sensing unit outputting the decision signal to the timing controller,
wherein the sensing unit senses the polarization control driving voltage through a second point of the electrode of the polarization control panel that is farthest away from the first point of the electrode of the polarization control panel to which the polarization control driving voltage is supplied.

2. The stereoscopic image display of claim 1, wherein the sensing unit outputs the decision signal based on a comparison result between the sensed polarization control driving voltage and an internal reference voltage.

3. The stereoscopic image display of claim 1, wherein the sensing unit comprises:
a filter that smoothes the sensed polarization control driving voltage to be close to a DC level; and
a comparator that compares a filtering voltage output from the filter and an internal reference voltage and outputs the decision signal.

4. The stereoscopic image display of claim 1,
wherein the sensing unit comprises:
a filter that smoothes the sensed polarization control driving voltage to be close to a DC level; and
a comparator that compares a filtering voltage output from the filter and an internal reference voltage and outputs the decision signal.

5. The stereoscopic image display of claim 1,
wherein the timing controller extracts an alarm data signal corresponding to an abnormal signal from an internal memory and supply the extracted alarm data signal to the display panel through a data driver.

6. The stereoscopic image display of claim 1,
wherein the timing controller analyzes the decision signal, and controls the display panel to display a black image or an alarm if the polarization control panel is detected as abnormal.

7. A method of driving a stereoscopic image display, the method comprising:
driving a display panel;
supplying a polarization control driving voltage to a first point of an electrode of a polarization control panel that is positioned on the display panel and controls a polarization direction of light incident from the display panel;
sensing the polarization control driving voltage supplied to the polarization control panel and deciding whether the sensed polarization control driving voltage is in normal condition or abnormal condition;
outputting a decision signal to a timing controller, the decision signal indicating whether the sensed polarization control driving voltage is in normal condition or abnormal condition; and
if the sensed polarization control driving voltage is detected as abnormal, switching a screen of the display panel to abnormal mode,
wherein, the sensed polarization control driving voltage is obtained from a second point of the electrode of the polarization control panel that is farthest away from the first point of the electrode of the polarization control panel to which the polarization control driving voltage is supplied; and
wherein in the switching of the screen of the display panel, a black image or an alarm is displayed on the display panel.

* * * * *